US010009285B2

(12) United States Patent
Mogul et al.

(10) Patent No.: US 10,009,285 B2
(45) Date of Patent: Jun. 26, 2018

(54) RESOURCE ALLOCATOR

(71) Applicant: HEWLETT PACKARD ENTERPRISE DEVELOPMENT LP, Houston, TX (US)

(72) Inventors: Jeffrey Clifford Mogul, Palo Alto, CA (US); Alvin Auyoung, Palo Alto, CA (US); Sujata Banerjee, Palo Alto, CA (US); Jung Gun Lee, Palo Alto, CA (US); Jean Tourrilhes, Palo Alto, CA (US); Michael Schlansker, Palo Alto, CA (US); Puneet Sharma, Palo Alto, CA (US); Lucian Popa, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 197 days.

(21) Appl. No.: 14/908,745

(22) PCT Filed: Jul. 30, 2013

(86) PCT No.: PCT/US2013/052794
§ 371 (c)(1),
(2) Date: Jan. 29, 2016

(87) PCT Pub. No.: WO2015/016848
PCT Pub. Date: Feb. 5, 2015

(65) Prior Publication Data
US 2016/0173403 A1 Jun. 16, 2016

(51) Int. Cl.
*G06F 15/173* (2006.01)
*H04L 12/911* (2013.01)
(Continued)

(52) U.S. Cl.
CPC ............... *H04L 47/70* (2013.01); *G06F 9/50* (2013.01); *H04L 41/0893* (2013.01); *Y02D 10/22* (2018.01)

(58) Field of Classification Search
USPC ................................. 709/226, 223, 224, 225
See application file for complete search history.

(56) References Cited

U.S. PATENT DOCUMENTS

2003/0126260 A1   7/2003   Husain et al.
2005/0262509 A1   11/2005   Kelly
(Continued)

FOREIGN PATENT DOCUMENTS

CN          103051565 A          4/2013

OTHER PUBLICATIONS

International Search Report and Written Opinion, International Application No. PCT/US2013/052794, dated Apr. 16, 2014, pp. 1-7.
(Continued)

*Primary Examiner* — Lan-Dai T Truong
(74) *Attorney, Agent, or Firm* — Hewlett Packard Enterprise Patent Department

(57) ABSTRACT

An example method for allocating resources in accordance with aspects of the present disclosure includes collecting proposals from a plurality of modules, the proposals assigning the resources to the plurality of modules and resulting in topology changes in a computer network environment, identifying a set of proposals in the proposals, the set of proposals complying with policies associated with the plurality of modules, instructing the plurality of modules to evaluate the set of proposals, selecting a proposal from the set of proposals, and instructing at least one module associated with the selected proposal to instantiate the selected proposal.

20 Claims, 6 Drawing Sheets

(51) Int. Cl.
*G06F 9/50* (2006.01)
*H04L 12/24* (2006.01)

(56) References Cited

U.S. PATENT DOCUMENTS

| | | |
|---|---|---|
| 2010/0274663 A1 | 10/2010 | Hinton et al. |
| 2012/0102369 A1 | 4/2012 | Hiltunen et al. |
| 2012/0303719 A1 | 11/2012 | Netto |
| 2013/0060818 A1 | 3/2013 | Lambeth et al. |
| 2013/0124712 A1 | 5/2013 | Parker |
| 2013/0138812 A1 | 5/2013 | Assuncao et al. |

OTHER PUBLICATIONS

Pontus Sköldström and Kiran Yedavalli, "Network Virtualization and Resource Allocation in OpenFlow-based Wide Area Networks," Feb. 28, 2012, pp. 1-5.

RESOURCE ALLOCATOR

BACKGROUND

Software-defined networking (SDN) is an approach to building computer networking equipment and software that separates and abstracts elements of these systems. These elements are called the control plane and the data plane.

An SDN controller is an application in SDN that manages flow control to enable intelligent networking. SDN controllers are based on protocols, such as OpenFlow, that allow servers to guide switches in terms of where to send packets and enables software to run on numerous types of hardware, rather than being tied down to proprietary equipment from one supplier. The controller may be considered the core of an SDN or similar controller-based system. The controller may lie between network devices at one end and applications at the other end. Any communications between applications and devices go through the controller. The controller also uses protocols such as OpenFlow to configure network devices and choose the optimal network path for application traffic.

BRIEF DESCRIPTION OF THE DRAWINGS

Example implementations are described in the following detailed description and in reference to the drawings, in which.

DETAILED DESCRIPTION

Figure 1:
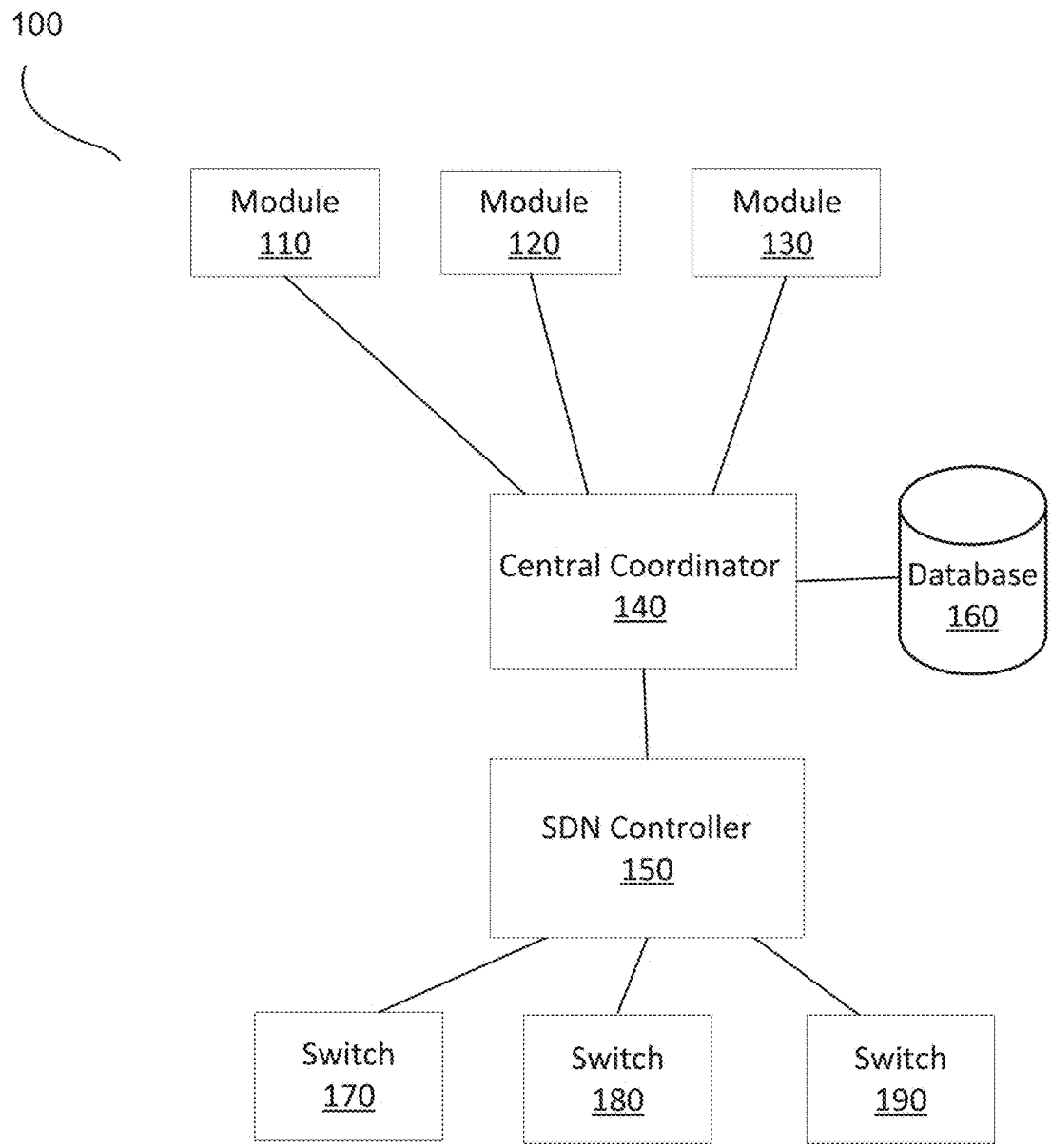
FIG. 1 illustrates example components of an example system in accordance with an implementation.

Various implementations described herein are directed to a controller framework. More specifically, and as described in greater detail below, various aspects of the present disclosure are directed to a manner by which a software defined networking controller framework achieves modular composition and maximizes the overall value delivered by the software defined networking controller's decisions.

Aspects of the present disclosure described herein allow multiple controller modules to operate in coordination and manage different aspects of the network while competing for resources. Accordingly, this approach may, among other things, improve allocation decisions. Moreover, aspects of the present disclosure described herein also allow modules to expose sufficient information about their local objectives and policies. Such aspects, among other results, maximize system-wide objectives while meeting all of their policy constraints. In addition, aspects of the present disclosure described herein involve collecting proposals from modules. Such aspects allow separating proposal-generation phase from proposal-evaluation phase. Among other things, this approach allows relieving the proposal generators from having to understand the value models of other modules. Accordingly, this approach may, among other things, allow the central controller integrate the opportunities provided by its constituent modules to approximate a globally-optimal objective, while meeting all of the policies (e.g., firewall rules) imposed by these modules.

In one example in accordance with the present disclosure, a method for allocating resources is provided. The method comprises collecting proposals from a plurality of modules. The proposals assign the resources to the plurality of modules and result in topology changes in a computer network environment. The method also comprises identifying a set of proposals in the proposals. The set of proposals comply with policies associated with the plurality of modules. The method further comprises instructing the plurality of modules to evaluate the set of proposals, selecting at most one proposal from the set of proposals, and instructing at least one module associated with the selected proposal to instantiate the selected proposal.

In another example in accordance with the present disclosure, a system is provided. The system comprises a plurality of controller modules to generate proposals, and a central coordinator to collect the proposals from a plurality of controller modules, and identify a set of proposals in the proposals. The coordinator instructs the plurality of controller modules to select the set of proposals that comply with policies associated with the plurality of controller modules. The central coordinator also instructs the plurality of controller modules to evaluate the set of proposals, selects at most one proposal from the set of proposals, and instructs at least one module associated with the selected proposal to instantiate the selected proposal.

In a further example in accordance with the present disclosure, a non-transitory computer-readable medium is provided. The non-transitory computer-readable medium comprises instructions that when executed cause a device to (i) collect proposals from a plurality of modules, (ii) identify a set of proposals in the proposals, the set of proposals complying with policies associated with the plurality of modules, (iii) instruct the plurality of modules to evaluate the set of proposals, (iv) select at most one proposal from the set of proposals, and (v) instruct at least one module associated with the selected proposal to instantiate the selected proposal.

FIG. 1 illustrates example components of the system 100 in accordance with an implementation. It should be readily apparent that the system 100 illustrated in FIG. 1 represents a generalized depiction and that other components may be added or existing components may be removed, modified, or rearranged without departing from a scope of the present disclosure. The system 100 comprises modules 110, 120 and 130, a central coordinator 140, and an SDN controller 150, each of which is described in greater detail below. It should be readily apparent that while the system 100 illustrated in FIG. 1 includes three modules, the system may actually comprise a different number of module devices, and three have been shown and described for simplicity.

The system 100 comprises controller modules 110, 120 and 130, each carrying a specific function and may be used alone or combined with other modules. In one implementation, a controller module may be a bandwidth allocator, which is a module that allocates guaranteed bandwidth to a set of endpoints. In another implementation, a controller module may be a flow latency controller, which is a module to support end-to-end latency bounds for flows or flow classes. In a further implementation, a controller module may be a flow-level traffic engineering, which is a module that re-routes flows to achieve an objective, such as load balance. In other implementations, a controller module may be a VM-migrator, which is a module that migrates VMs between servers, e.g., for consolidation. In some other implementations, a controller module may be a power control manager, which is a module that reduces energy costs by attempting to turn off under-utilized resources.

The controller modules 110, 120 and 130 may generate one or more proposals for reservations of resources. In one implementation, a proposal may represent a change in the current reservation state with a specific start time and end time. Such proposals propose to modify the system 100, which results in a topology change. The topology change may involve turning servers, switches, or links on or off, adding a switch table entry, or moving virtual machines (e.g., a software implementation of a machine (i.e. a computer) that executes programs like a physical machine). Further, the resources may include a fraction of a link's bandwidth, a rate limiter or switch port, an entire line card, an internet group management protocol table entry, a virtual local area network tag, a queue and an OpenFlow table entry.

The modules 110, 120 and 130 may generate proposals in response to new inputs (e.g. a customer request for bandwidth), changes in network reservation state (e.g., no more reservations for line-card), and periodic timer (e.g., load balancing across link technologies).

In some implementations, some modules may generate multiple proposals per round. In another implementation, some modules may generate proposals only at certain times. In other implementations, some modules may not generate any proposals.

Each individual module 110, 120 or 130 may have its own set of policies and objectives. In one implementation, policies may express constraints on what may be allowed, and objectives may express the costs and benefits of specific proposals. For example, a QoS-control module's objectives may include maximizing the revenue from bandwidth promises made to customers, and one of its policies might include not reneging on a promise. In one implementation, a topology proposed by one module might violate the policies of another module. For such implementation, it may be necessary to enforce each module's policies.

Further, modules 110, 120 and 130 may evaluate and assign a value to each proposal. The assigned value may be a negative or positive value or zero. The value may represent the benefits that each module gains from a proposal, the costs imposed on each module, including the cost of making changes (e.g., moving a VM) and any costs created by delays in completion of a proposal (e.g., due to unfair allocation of resources). For example, a QoS controller may express value as the revenue collected by the flows it can support within a proposal. In one implementation, where a module enforces its polices and marks a proposal as violating specific constraints, only zero-violation proposals may be evaluated.

In one implementation, in order to compare costs and benefits across a range of independent modules (e.g., the modules 110, 120 and 130), the SDN controller 150 may express these using a common currency. For example, the values assigned to the proposals by the modules 110, 120 and 130 may be expressed in terms of dollars to reflect the grounding of these values in the real-world money flowing into and out of the provider. In another example, a different real-world currency may be used.

In one implementation, the modules 110, 120 and 130 may be prioritized. More specifically, modules may be prioritized through the valuations placed on its specific proposals, and prioritization may not be an explicit property of the module. The system 100 may choose to use dynamic changes in the relative merits of assigning a resource to one module or another, rather than determining assignment via static module priorities. For example, load balance might be more important during peak hours, while power reduction might matter more during off-peak hours, as reflected entirely in the values that these modules place on proposals during those periods.

The system 100 comprises a central coordinator 140. In one implementation, the central coordinator 140 may be carried out on the operation of the SDN controller 150 and have an associated set of modules (e.g., the modules 110, 120 and 130). The central coordinator 140 may proceed in periodic rounds, and in each round, the central coordinator 140 and its modules 110, 120 and 130 may execute a plurality of phases. Such phases may include, but not limited to, collecting proposals from the modules 110, 120 and 130, requesting that each module 110, 120 and 130 evaluate the proposals, selecting the proposal with the highest value and instructing the modules 110, 120 and 130 to instantiate the selected proposal.

More specifically, the central coordinator 140 may be in communication with the modules 110, 120 and 130. In particular, the central coordinator 140 may issue a set of commands to the modules 110, 120 and 130. Such commands may include, but not limited to, MakeProposals( ), in response to which a module can return zero or more proposals for the given round, CheckProposal(Proposal), in response to which a module indicates whether the proposal violates any policy constraints, EvaluateProposal(Proposal), in response to which a module provides its valuation for the proposal. As mentioned above, each proposal may be sent to every module for evaluation, and the valuation may be negative.

Another command may include Proposal Rejected(Proposal, TotalValue, Rank, Reason), which informs a module that one of its proposals was rejected, along with the total valuation that it received from all modules, the proposal's rank among all that were evaluated in this round, and the reason a proposal was rejected. In one example, a proposal may be rejected if it violates a module's constraints, or if another competing proposal (or set of proposals) is chosen instead (including maintaining status quo). The above mentioned three values may help the module to decide whether to resubmit the proposal.

Another command may include ProposalAccepted(Proposal, StartTime, EndTime), which informs a module that its proposal is accepted with specific start and end times. In response, the module returns a boolean indicating whether it chooses to proceed with the proposal. Another command may include InstantiateProposal(Proposal, StartTime, EndTime), which informs a module to instantiate a winning proposal. Such winning proposal may be made by that specific module or by another module.

In one implementation, the proposal may have a range of acceptable start times in addition to a range of acceptable durations or end times. In addition, the central coordinator 140 may calculate the time that may be necessary to implement the proposal. If the proposal is accepted by the system 100, the central coordinator 140 may inform the module that generated the proposal what the range of feasible start and end times are. Based on such information, the module that generated the proposal may confirm to the central coordinator 140 whether such ranges of times are acceptable.

In one implementation, the central coordinator 140 may request from the modules 110, 120 and 130 that the proposals being submitted by the modules 110, 120 and 130 involve proposals that require significant amount of changes in the system 100. The central coordinator 140 may inject occasional such jumps and decide when a round may make a jump. In addition, the central coordinator 140 may decide the magnitude of the jump.

In one implementation, at most one proposal is selected. The central coordinator 140 may assign a global value to each proposal. Such a global value may represent the sum of the values assigned by the modules 110, 120 and 130. Based on the global value, the central coordinator 140 may select the best proposal. The best proposal may have the highest value in comparison to the other proposals. In one example, the central coordinator 140 may not consider values that are not positive. In the event that the value is negative, the proposal may not be selected even though it may have the highest value in the collected set of proposals. Further, the central coordinator 140 may direct the modules 110, 120 and 130 that are affected by the proposal to instantiate it.

The central coordinator 140 may be connected to a reservation state database 160. In one implementation, accepting a proposal may be considered as the assignment of certain resources to certain modules. Accordingly, these resources may be reserved for those modules during the duration of the proposal. These reservations may be stored in the reservation state database 160. In one implementation, access to the reservation state database 160 may be limited to the central coordinator 140 to write changes to the reservation state database 160.

The system 100 may comprise the SDN controller 150, which acts as the core of the SDN and manages flow control to enable intelligent networking. In one implementation, the SDN controller 150 may be distributed across multiple servers, for scalability and reliability.

The system 100 may comprise the switches 170, 180 and 190, which are in communication with the SDN controller 150. In one implementation, the switches 160, 170 and 180 may be virtual switches. The SDN controller 150 may lie between the central coordinator 140 (and the modules 110, 120 and 130) and switches 170, 180 and 190. More specifically, any communications between the central coordinator 140 and the switches 170, 180 and 190 go through the SDN controller 150. In one implementation, the SDN controller 150 may have an application programming interface (API) for communicating with network elements (e.g., switches, routers, hypervisors, etc.) and an API for communication with application modules (e.g. the modules 110, 120 and 130). The APIs may specify how the software components interact with each other. In one example, the APIs may involve libraries including specification for routines, data structures, object classes and variables. For example, the API for communicating with the network elements may be one of a small set of industry-wide standards, such as OpenFlow®.

In one implementation, the system 100 may include a global flow assigner (not shown in FIG. 1). Such global flow assigner may be a module that accepts constraints from other modules (e.g., the modules 110, 120 and 130). The global flow assigner may be configured to create an assignment for each proposal such that all flows are allocated sufficient resources consistent with the proposed reservation state.

Figure 2:
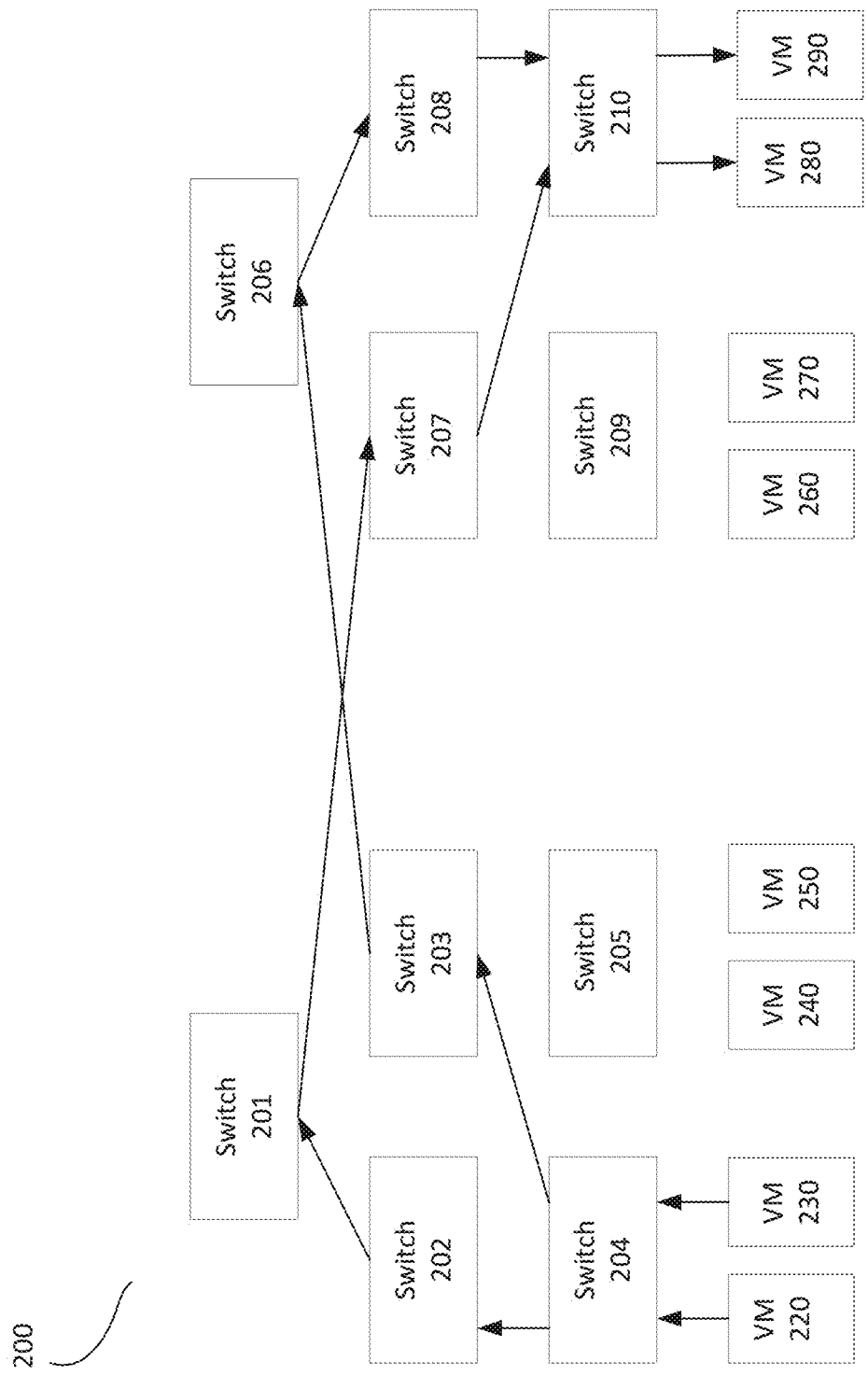
FIG. 2 illustrates an example network path in an example system in accordance with an implementation.

FIG. 2 illustrates a physical topology of a system 200 including a set of virtual machines (e.g., VMs 220, 230, 240, 250, 260, 270, 280, 290) in accordance with an implementation. The system 200 shows a first iteration round during which a guaranteed pipe bandwidth (GPB) module generates a proposal for a subset of topology that maximizes its utility function. The GPB tries to spread each flow out in anticipation of future bandwidth demand. The proposal requests two flows: VM 220 to VM 280 and VM 230 to VM 290. The flow from VM 220 to VM 280 travels from switch 204 to 202 to 201 to 207 to 210. The flow from VM 230 to VM 290 travels from switch 204 to 203 to 206 to 208 to 210. The switches that the flow does not travel through are off. It should be readily apparent that the system 200 illustrated in FIG. 2 represents a generalized depiction and that other components may be added or existing components may be removed, modified, or rearranged without departing from a scope of the present disclosure.

In one implementation, the GPB, like other modules, may consider a set of principles. One of the principles may be making proposals that require the right amount of change. If a proposed topology change is too large, such proposed topology may disrupt the module's own needs too much, or the cost of change may be too high. Accordingly, the other modules in the system may give the proposal a negative value. In another implementation, modules may propose changes that are small. However, it should be noted that certain proposals may be considered too small and leave the network mid-way between useful states. For example, if a VM migrator module is configured to move 10 VMs from a server, a proposal that moves just one VM probably may have little or no value.

Another principle considered by the GPB may be related to the number of proposals. In one implementation, providing multiple topology options may give the SDN controller more options to evaluate and lead to faster convergence to a useful state. A further principle may focus on the variety of proposals. In one example, when making multiple proposals, the system may consider proposals that are different from one another. Accordingly, the benefits of having more options to evaluate may justify the extra cost of evaluating these multiple proposals. Another principle may provide guidance around the timing of the proposals. For example, a module may build upon information gained from previous iterations to make informed counter proposals that differ enough from rejected proposals and relate to higher-valued proposals.

In one implementation, proposals and evaluations may both include time-frames over which they are desirable or valid. More specifically, a proposal may not be instantiated instantaneously. For example, a VM migrator module may take several minutes to move a large VM. Thus, proposals requesting such move may specify the expected delay-to-instantiate. Moreover, some modules may tag their proposals with deadlines. For example, a VM migrator module that is responsible for responding to thermal overloads may require rapid changes.

In one implementation, the code in each module may re-compute a value given to the entire proposed topology in view of the evaluation. In another implementation, the proposals may be expressed as deltas. More specifically, the code in each module that evaluates proposals may use an incremental algorithm.

In a further implementation, the value of the change that results from the implementation of the proposal may expire after a certain amount of time. For example, a QoS module may admit a high-bandwidth flow that may last for 2 minutes. If making room for this flow incurs a cost that lasts for at least 5 minutes (e.g., turning on a switch), the benefit of admitting the flow may not justify the cost.

In another implementation, the system may have goals that may create constraints for a topology proposed by a module. For example, a thermal overload may be considered an emergency for the system and may need to be resolved immediately. In such example, resolving the thermal overload may lead to violation of some network performance guarantees. In other implementations, other constraints may be tagged to indicate that they may be temporarily violated during emergencies.

As described in greater detail in reference to FIG. 1, the proposal illustrated in FIG. 2 may be evaluated by a plurality of modules. Each module may assign a score to the proposal. For example, a score UGPB may be assigned by the GPB and may be based on the revenue from new and future flows. A score UPC may be assigned by a power controller (PC) module and may be based on the cost of power saved. A score UMIG may be assigned by the VM migrator module (MIG) and may be based on the sum of many possible benefits of moving a VM (e.g., to place the VMs 380 and 390 on separate physical hosts as will be described in greater detail in reference to FIG. 4). In one set of circumstances, for the proposal illustrated in FIG. 2, the UGPB may be 1; UPC may be 0.5; and UMIG may be 0.5.

Figure 3:
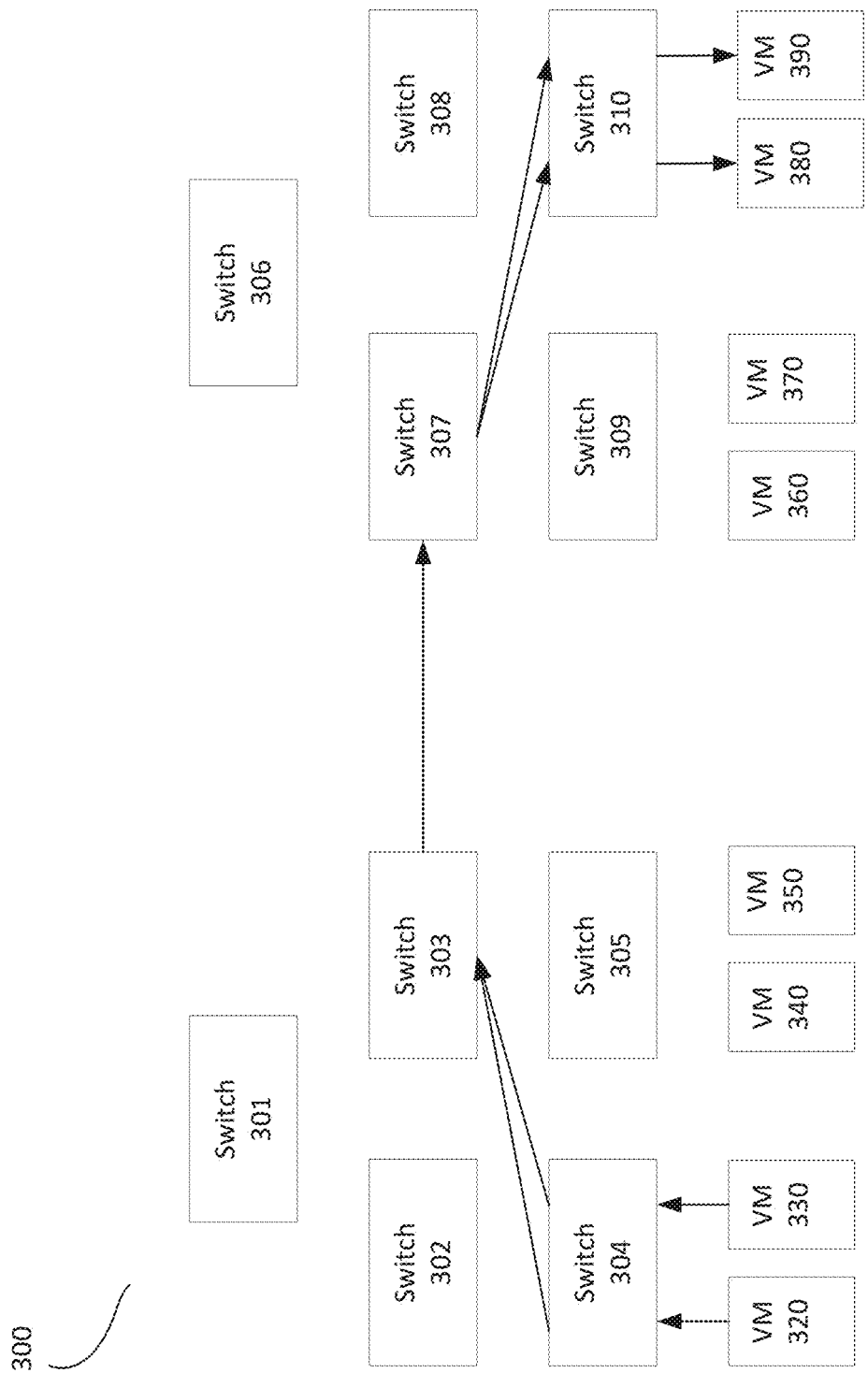
FIG. 3 illustrates an example network path in an example system in accordance with an implementation.

FIG. 3 illustrates a physical topology of a system 300 including a set of virtual machines (e.g., VMs 320, 330, 340, 350, 360, 370, 380, 390) in accordance with an implementation. The system 300 shows a proposal submitted by a PC that requests two flows: VM 320 to VM 380 and VM 330 to VM 390. The PC tries to consolidate traffic so that it may turn off switches/links. Accordingly, the PC proposes shutting off a plurality of switches. The flow from VM 320 to VM 380 travels from switch 304 to 303 to 307 to 310. The flow from VM 330 to VM 390 travels the same path, from switch 304 to 303 to 307 to 310. The switches that the flow does not travel through are off. It should be readily apparent that the system 300 illustrated in FIG. 3 represents a generalized depiction and that other components may be added or existing components may be removed, modified, or rearranged without departing from a scope of the present disclosure.

In one implementation, the proposal illustrated in FIG. 3 may be evaluated by the modules. For example, the score UGPB may be 0.6; UPC may be 1.0; and UMIG may be 0.5.

Figure 4:
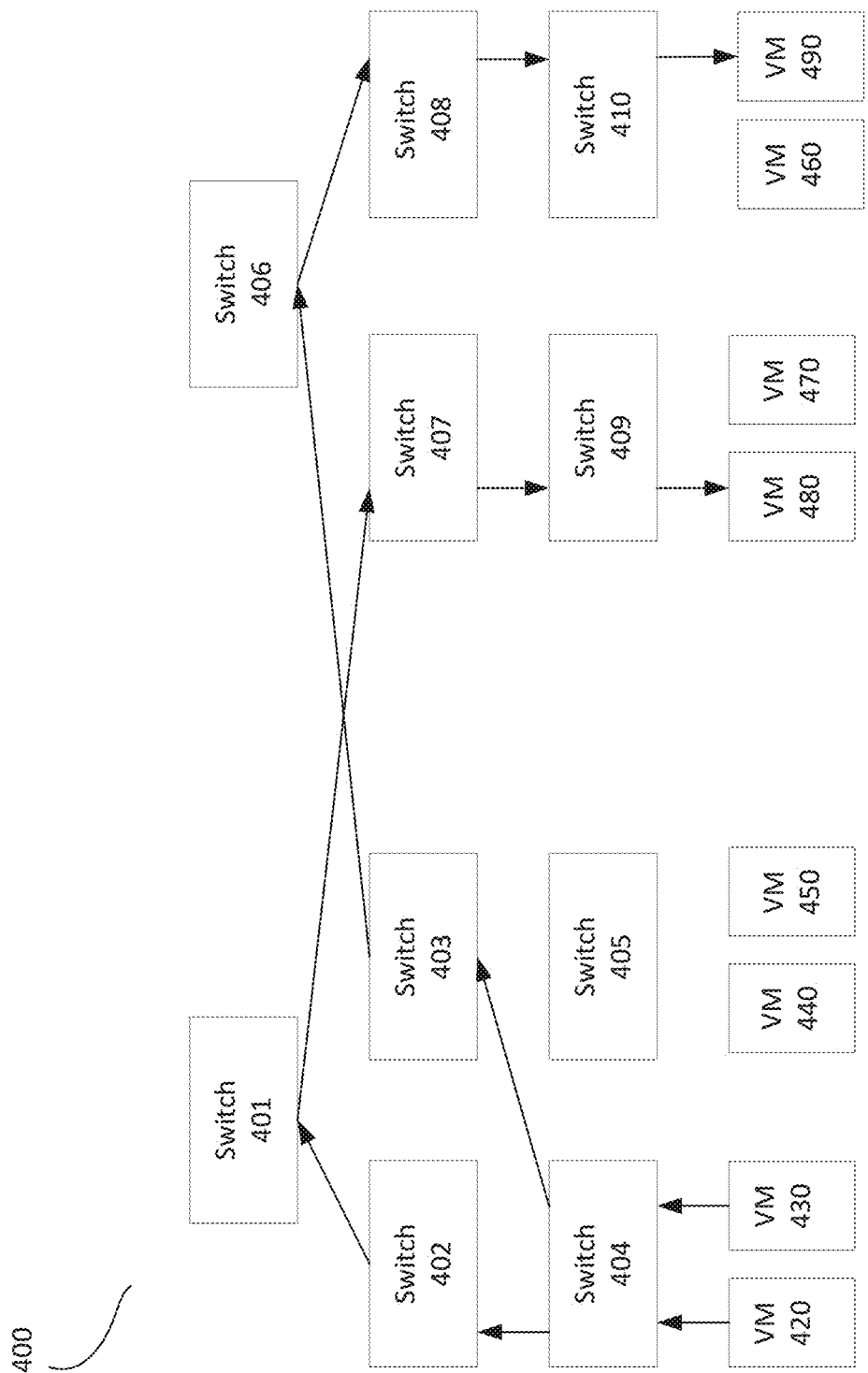
FIG. 4 illustrates an example network path in an example system in accordance with an implementation.

FIG. 4 illustrates a physical topology of a system 400 including a set of virtual machines (e.g., VMs 420, 430, 440, 450, 460, 470, 480, 490) in accordance with an implementation. The system 400 shows a proposal submitted by a MIG that requests two flows: VM 420 to VM 480 and VM 430 to VM 490. The MIG proposes moving VM 480 to a different server, requiring moving the VM 420-480 flow and allocating resources for a new flow to transfer the VM itself. The flow from VM 420 to VM 480 travels from switch 404 to 402 to 401 to 407 to 409. The flow from VM 430 to VM 490 travels from switch 404 to 403 to 406 to 408 to 410. The switches that the flow does not travel through are off. It should be readily apparent that the system 400 illustrated in FIG. 4 represents a generalized depiction and that other components may be added or existing components may be removed, modified, or rearranged without departing from a scope of the present disclosure.

In one implementation, the proposal illustrated in FIG. 4 may be evaluated by the modules. For example, the score UGPB may be 0.8; UPC may be 0.66; and UMIG may be 1.0.

In one implementation, the system may select a proposal by comparing the per-module valuations. The scores for each proposal (e.g., the values from FIG. 2, the values from FIG. 3, and the values for FIG. 4) may be summed up. For example, the total score from FIG. 2 is 2; the total score from FIG. 3 is 2.1; and the total score from FIG. 4 sums up to 2.46, which is the highest total value. Accordingly, the MIG proposal illustrated in FIG. 4 may be selected to be implemented.

Figure 5:
FIG. 5 illustrates an example controller in accordance with an implementation.

FIG. 5 is a block diagram illustrating aspects of a SDN controller 500 including a processor 510 and a machine-readable storage medium 520 encoded with instructions that a central coordinator executes, according to an example. The SDN controller 500 may be any of a variety of computing devices, such as a chip, an expansion card or a stand-alone device that interfaces with a peripheral device such as a workstation computer, a desktop computer, a laptop computer, a tablet or slate computer, a server computer, or a smart phone, among others.

The processor 510 may be at least one central processing unit (CPU), at least one semiconductor-based microprocessor, other hardware devices or processing elements suitable to retrieve and execute instructions stored in the machine-readable storage medium 520, or combinations thereof. The processor 510 can include single or multiple cores on a chip, multiple cores across multiple chips, multiple cores across multiple devices, or combinations thereof. The processor 510 may fetch, decode, and execute instructions 522, 524, 526, 528, among others, to implement various processing. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526, 528. Accordingly, processor 510 may be implemented across multiple processing units and instructions 522, 524, 526, 528 may be implemented by different processing units in different areas of computer 500.

In one implementation, the computer readable medium 520 may include program memory that includes programs and software such as an operating system, user detection software component, and any other application software programs. Further, the non-transitory computer readable medium 520 may participate in providing instructions to the processor 510 for execution. The non-transitory computer readable medium 520 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

The instructions 522, 524, 526, 528, when executed by processor 510 (e.g., via one processing element or multiple processing elements of the processor) can cause processor 510 to perform processes, for example, the processes depicted in FIGS. 1-4.

Collection instructions 522 may cause the processor 510 to collect data regarding at least one proposal submitted by the modules in the SDN. Each module makes a proposal to modify the system 100, which results in a topology change. The topology change leads to a subset of topology that maximizes its utility function and reserve resources. Evaluation instructions 524 may cause the processor 510 to instruct the modules to evaluate the submitted proposals. Each module evaluates one proposal at a time, and assigns the proposal a score based on its evaluation. Selection instruction 526 may cause the processor 510 to select one proposal based on the scores assigned by the modules. The proposal with the highest score may be selected. Implementation instructions 528 may cause the processor 510 to instruct any modules that are affected by the selected proposal to instantiate the chosen proposal. This may involve changing a topology element, moving a VM or informing a user associated with the VM that may be moved that the user may have more or less access to spare capacity as a result of the move of the VM.

Figure 6:
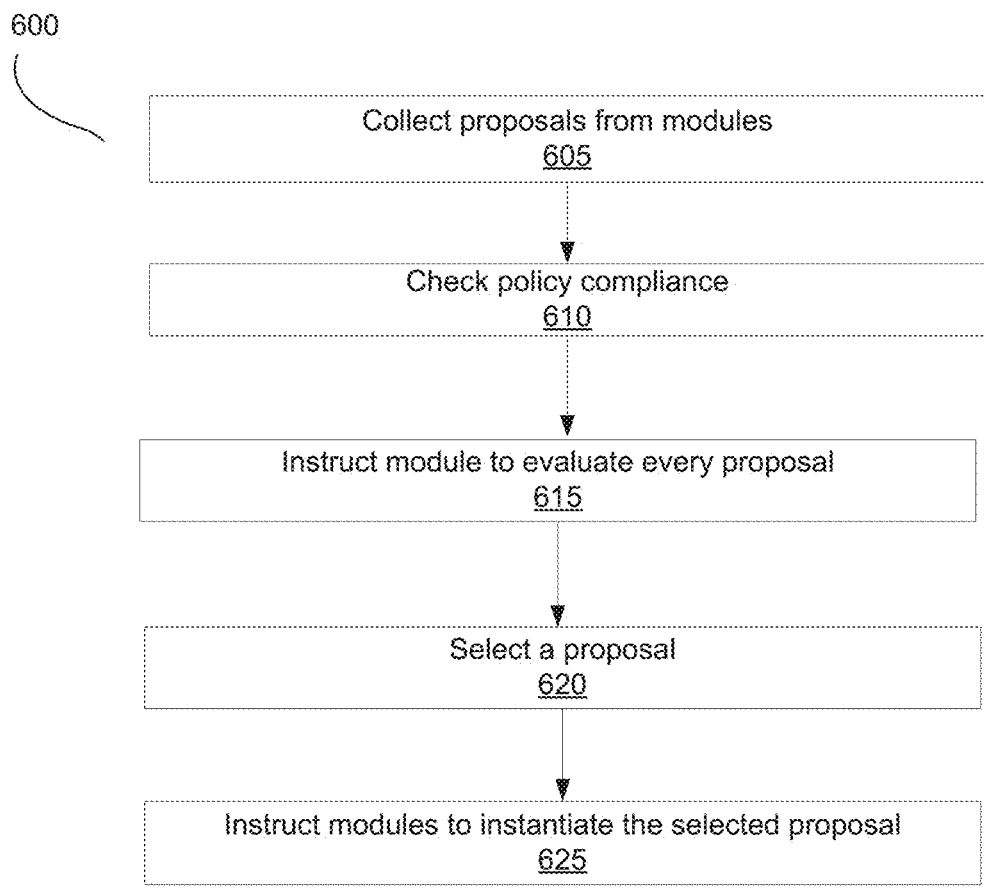
FIG. 6 illustrates an example process flow diagram in accordance with an implementation.

Turning now to the operation of the system 100, FIG. 6 illustrates an example process flow diagram 600 in accordance with an implementation. It should be readily apparent that the processes illustrated in FIG. 6 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with a system 100. Alternatively or in addition, the processes may represent functions and/or actions performed by functionally equivalent circuits like an analog circuit, a digital signal processor circuit, an application specific integrated circuit (ASIC), or other logic devices associated with the system 100. Furthermore, FIG. 6 is not intended to limit the implementation of the described implementations, but rather the figure illustrates functional information one skilled in the art could use to design/fabricate circuits, generate software, or use a combination of hardware and software to perform the illustrated processes.

The process 600 may begin at block 605, where proposals from some modules are received. As discussed above in reference to FIG. 1, a proposal is a change in the reservation state or activity (on/off) of a resource in the topology. In one implementation, each module may make zero or more proposals to modify the topology. A topology change may involve turning servers, switches, or links on or off, adding a switch table entry, or moving virtual machines. In some implementations, some elements, such as storage devices and external access links, might be unmovable.

At block 610, each module determines whether each proposal is compliant with the module's policies. In particular, this process may involve each module enforcing its policies. If it is determined that the topology proposed by one module violates the policies of another module, the proposal may be marked as violating specific constraints, and the proposal may be removed from consideration. Accordingly, the proposal is not evaluated further by any of the modules, and the system continues evaluating the proposals that comply with the module policies.

In the event that the proposal is compliant with the policies of the modules evaluating the proposal, at block 615, the central coordinator instructs each module to evaluate every proposal. In particular, this process may involve assigning a value to the proposals based on the evaluation. In one implementation, the value reflects the benefits that the module gains from a proposal, the costs imposed on the module, including the cost of making changes (e.g., moving a virtual machine) and any costs unique to the module. For example, a QoS controller may express a value of the revenue that may be collected if the proposal is executed. Some modules might give a negative value to a proposal. By distributing the task of proposal evaluation to all of the modules in the system, we modularize the values that derive from various points of view. For example, the power module only needs to consider the electricity-related costs and benefits of turning off a switch, while the QoS-related benefits (which might be negative) are measured entirely within other modules.

At block 620, the system proceeds to select a proposal. In particular, this process may involve determining the sum of the values assigned to each proposal by all the modules. The total values are compared, and the proposal with the highest score is selected. In one implementation, the central coordinator may not consider values that are not positive. In the event that the value is negative, the proposal may not be selected even though it may have the highest value in the collected set of proposals.

At block 625, the central coordinator directs the modules that are affected by the selected proposal to instantiate the selected proposal. In particular, this process may involve updating the global state to reflect the change. In one implementation, this change may involve changing a topology element, moving a VM or informing a user that its VMs may have more or less access to spare capacity.

In one implementation, the central coordinator may calculate the time necessary to implement the proposal. In such calculation, the central coordinator may consider the range of acceptable start times and range of acceptable durations or end times specified in the proposal. Further, when the proposal is selected, the central coordinator may inform the module that generated the proposal of the ranges of feasible start and end times, and in response, the module that generated the proposal may confirm whether these ranges are acceptable.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method for allocating resources, comprising:
   collecting proposals at a central coordinator and from a plurality of controller modules, the proposals assigning the resources to the plurality of controller modules and resulting in topology changes in a computer network environment;
   identifying, by the central coordinator, a set of proposals in the proposals, the set of proposals complying with policies associated with the plurality of controller modules;
   instructing, by the central coordinator, the plurality of controller modules to evaluate the set of proposals;
   selecting, by the central coordinator, a proposal from the set of proposals; and
   instructing, by the central coordinator, at least one controller module associated with the selected proposal to instantiate the selected proposal.

2. The method of claim 1, wherein the plurality of controller modules evaluate the set of proposals by assigning each proposal a value.

3. The method of claim 2, wherein selecting the proposal from the set of proposals further comprises summing the values assigned to each proposal and identifying the proposal with the highest value.

4. The method of claim 3, further comprising eliminating, by the central coordinator, a proposal if the summed value associated with the proposal is negative.

5. The method of claim 2, wherein at least one of the plurality of controller modules generates multiple proposals per round.

6. The method of claim 1, wherein each proposal has a range of start times and a range of end times, and wherein a value associated with each proposal changes based on the start times and end times.

7. The method of claim 6, further comprising confirming, by the central coordinator and with the at least one controller module associated with the selected proposal, that the ranges of start and end times of the selected proposal are acceptable.

8. The method of claim 1, wherein the plurality of controller modules comprises a centralized flow assigner creating an assignment for each proposal.

9. The method of claim 1, wherein each controller module has policies and objectives, policies expressing constraints and objectives expressing costs and benefits associated with the proposals.

10. The method of claim 1, wherein the plurality of controller modules comprises at least one of a bandwidth allocator, a flow latency controller, a flow-level traffic engineering module, a VM migrator and a power control manager.

11. An system, comprising:
a plurality of controller modules to generate proposals; and
a central coordinator to:
collect the proposals from a plurality of controller modules;
identify a set of proposals in the proposals, the set of proposals complying with policies associated with the plurality of controller modules;
instruct the plurality of controller modules to evaluate the set of proposals;
select a proposal from the set of proposals; and
instruct at least one module associated with the selected proposal to instantiate the selected proposal.

12. The system of claim 11, further comprising a database to record the assignment of resources to the plurality of controller modules.

13. The system of claim 11, wherein the proposals assign resources to the plurality of modules, and wherein the selected proposal maximizes benefits of the system.

14. The system of claim 11, wherein the plurality of controller modules comprises a flow assigner to create an assignment for each proposal.

15. The system of claim 11, wherein the central coordinator proceeds in periodic rounds.

16. The system of claim 11, further comprising an application programming interface having a set of calls made from the central coordinator to the plurality of modules.

17. The system of claim 16, wherein the set of calls comprises make proposals, check proposal, evaluate proposal, proposal rejected, proposal accepted and instantiate proposal.

18. The system of claim 11, further comprising a software defined network controller central coordinator operating the central coordinator, and a plurality of virtual machines in communication with the software defined network controller.

19. The system of claim 18, further comprising at least one switch in communication with the software defined network controller, wherein any communication between the central coordinator and at least one switch is controlled by the software defined network controller.

20. A non-transitory computer-readable medium comprising instructions that when executed cause a system to:
collect proposals from a plurality of modules;
identify a set of proposals in the proposals, the set of proposals complying with policies associated with the plurality of modules;
instruct the plurality of modules to evaluate the set of proposals;
select a proposal from the set of proposals; and
instruct at least one module associated with the selected proposal to instantiate the selected proposal.

* * * * *